US007454078B2

(12) United States Patent
Ramamurthy

(10) Patent No.: US 7,454,078 B2
(45) Date of Patent: Nov. 18, 2008

(54) METHOD AND APPARATUS FOR FLICKER REMOVAL FROM AN IMAGE SEQUENCE

(75) Inventor: Arjun Ramamurthy, Glendale, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 822 days.

(21) Appl. No.: 10/887,774

(22) Filed: Jul. 9, 2004

(65) Prior Publication Data

US 2005/0018920 A1 Jan. 27, 2005

Related U.S. Application Data

(60) Provisional application No. 60/489,215, filed on Jul. 22, 2003.

(51) Int. Cl.
*G06K 9/40* (2006.01)
(52) U.S. Cl. .................. 382/254; 382/274; 382/275; 358/3.26; 358/3.27
(58) Field of Classification Search ................ 382/255, 382/260, 274, 275; 358/3.26, 3.27, 463
See application file for complete search history.

(56) References Cited

U.S. PATENT DOCUMENTS

| | | | |
|---|---|---|---|
| 5,793,886 A | | 8/1998 | Cok |
| 5,828,366 A | * | 10/1998 | Hurst .......................... 345/204 |
| 5,844,619 A | | 12/1998 | Songer |
| 6,097,837 A | | 8/2000 | Cok |
| 6,469,734 B1 | * | 10/2002 | Nichani et al. .............. 348/152 |
| 6,630,953 B1 | * | 10/2003 | Toyoda et al. ............ 348/226.1 |
| 6,898,327 B1 | * | 5/2005 | Hrusecky et al. ........... 382/260 |

OTHER PUBLICATIONS van Roosmalen, P. M. B., "Correction of Intensity Flicker in Old Film Sequences," *IEEE Transactions on Circuits and Systems for Video Technology*, vol. 9, No. 7, Oct. 1999, pp. 1013-1019.
Naranjo, Valery, et al., "Flicker Reduction in Old Films," 3 pages, date 2000, pp. 6-8.
P. Richardson and D. Suter. Restoration of Historic Film for Digital Compression: A Case Study. In Proc. of ICIP-95, ICIP95, 1995, pp. 49-52, vol. 2, USA.

* cited by examiner

*Primary Examiner*—Yosef Kassa
(74) *Attorney, Agent, or Firm*—Connolly Bove Lodge & Hutz LLP; Jonathan A. Jaech

(57) ABSTRACT

A method for removing flicker in a sequence of images, wherein each image in the sequence of images includes a plurality of pixels. The method includes providing a sequence of images including a source image and a target image, defining a plurality of regions of interest in the source image and a plurality of spatially counterpart regions of interest in the target image, measuring an image quality for all of the pixels in each of the regions of interest in the source image, measuring an image quality for all of the pixels in each of the spatially counterpart regions of interest in the target image, and generating a corrected source image on a region of interest basis depending on the image quality for the pixels in each of the plurality of regions of interest in the source image and the spatially counterpart regions of interest in the target image.

20 Claims, 6 Drawing Sheets

METHOD AND APPARATUS FOR FLICKER REMOVAL FROM AN IMAGE SEQUENCE

CROSS-REFERENCE TO RELATED APPLICATION

Priority is claimed under 35 U.S.C. § 119(e) to U.S. Provisional Patent Application No. 60/489,215, filed on Jul. 22, 2003, entitled "Method And Apparatus For Flicker Removal From An Image Sequence" by Arjun Ramamurthy, which application is incorporated by reference herein.

BACKGROUND OF THE INVENTION

1. Field of the Invention

The invention relates to the field of image processing. More specifically, the invention relates to a method for removing flicker from an image sequence.

2. Description of Related Art

Flicker is a term that refers to both global and localized temporal fluctuations in luminance amplitude, contrast, and chrominance amplitude (in the case of color sequences) in a motion picture image sequence. These fluctuations between one frame, a single image in the sequence, and another frame can be random, quick, and uncorrelated to one another. The image sequence can be in black and white or color, or even a combination of black and white separations combined to produce a color sequence.

Flicker can be caused by a variety of factors including: degradation of the recording media, e.g., film negative; variations in the density of the recording media caused by variations in development or exposure; variations in the light, both in luminance and chrominance, while recording the image sequence; and ac variations due to fluorescent lighting or ac variations present in the recording media. Also, flicker can result from disparate storage conditions and recording conditions for separations in the case where black and white separations are combined to make a color sequence. In addition, flicker can result from improper cleaning of the recording media, e.g., when cleaning the media with improper chemicals, which form globules on the surface of the media. The globules mottle the surface of the recording media and cause random variation in the density of the media, and, thus the quality of the image sequence.

Attempts have been made to correct for flicker by equalizing values of histograms of the intensity of the luminance, contrast, or chrominance, or by equalizing the mean frame value of the luminance, contrast, or chrominance, for consecutive frames. However, these methods do not take into account changes in scene content. Also, these methods are unable to compensate for motion within the image sequence, and they are unable to compensate for spatially localized flicker.

In addition, attempts have been made to correct for flicker by determining the mean and the variance of the luminance, contrast, or chrominance, for individual pixels within predetermined blocks of an image, and then correlating the blocks in different frames. The resulting correction that is applied to a block of an image is a linear multiplicative term that simply is calculated from the ratio of the blocks under examination. However, the large discrepancy in noise, variance, and film grain between successive frames in an image sequence make this approach an unviable one. Another disadvantage associated with this approach is that it is valid only for small motions of the camera and for objects moving relatively slowly within a scene. A further disadvantage associated with this approach is that it does not utilize histograms to classify image data.

Accordingly, there is a need for a flicker removal method that takes into account changes in scene content including motion within a sequence in addition to spatially localized and global flicker. The present invention satisfies this need.

SUMMARY OF THE INVENTION

Embodiments of the present invention include a method and apparatus for flicker correction that takes into account changes in scene content including motion within a sequence, spatially localized flicker, and global flicker. An exemplary method according to the invention is a method for removing flicker in a sequence of images, wherein each image in the sequence of images includes a plurality of pixels. The method includes providing a sequence of images having a source image and a target image, defining a plurality of regions of interest in the source image and a plurality of spatially counterpart regions of interest in the target image, measuring an image quality for all of the pixels in each of the regions of interest, measuring an image quality for all of the pixels in each of the spatially counter regions of interest, and generating a corrected source image on a region of interest basis depending on the image quality for the pixels in each of the plurality of regions of interest in the source image and the spatially counterpart regions of interest in the target image.

In other, more detailed features of the invention, the target image is selected from the group consisting of a previous target image that is before the source image in the sequence of images and a next target image that is after the source image in the sequence of images. A shape of the regions of interest in both the source image and the target image is selected from the group consisting of a rectangle, a square, and a triangle. Each image of the sequence of images is included in one frame of a motion picture. The sequence of images is stored on a storage disk. The images in the sequence of images are black and white images, color images, or a combination of black and white images and color images. The image quality is selected from the group consisting of luminance amplitude, contrast, and chrominance amplitude.

In other, more detailed features of the invention, the method further includes calculating similarity measurements of the image quality for the pixels in each of the plurality of regions of interest in the source image and each of the plurality of spatially counterpart regions of interest in the target image, and comparing the similarity measurements to a tolerance value. If any of the similarity measurements is greater than or equal to the tolerance value, then both the region of interest in the source image and the spatially counterpart region of interest in the target image for which the similarity measurement is greater than or equal to the tolerance value are subdivided, the similarity measurements for each subdivided region of interest in both the source image and the target image are recalculated, the recalculated similarity measurements are compared to the tolerance value, and the regions of interest in both the source image and the target image are subdivided until the similarity measurements for each region of interest are less than the tolerance value.

In other, more detailed features of the invention, the method further includes selecting a first window within the source image and a spatially counterpart second window within the target image, and calculating motion detection values for both the first window and the second window. A shape of the first and second windows is selected from the group consisting of a rectangle, a square, a triangle, an ellipse, and a circle. The motion detection value is an average value of the image quality for the pixels within a window.

In other, more detailed features of the invention, the method further includes calculating a difference between the motion detection value for the first window and the motion detection value for the second window, where if the difference between the motion detection values for the first and second windows is less than a tolerance, coordinates of the region of interest within which the first window is located and coordinates of the region of interest within which the second window is located are stored in memory. Otherwise, the regions of interest within which the first and second window are located are subdivided, the first and second windows are reselected, the motion detection value is recalculated for both the first and second windows, and this process is repeated until the difference between the motion detection values for the first and second windows is less than the tolerance.

In other, more detailed features of the invention, the method further includes calculating a histogram of the image quality for the source image, calculating a histogram of the image quality for each of the plurality of regions of interest in both the source image and the target image after the difference between the motion detection values of the first window and the second window is less than the tolerance, averaging the histogram of each region of interest in the source image and the histogram of each spatially counterpart region of interest in the target image to generate a cumulative histogram for each regions of interest in the source image, normalizing the cumulative histogram for each region of interest in the source image by the histogram for the source image, inverse mapping the normalized cumulative histogram for each region of interest in the source image, and generating the corrected source image based on the inverse mapping of the normalized cumulative histogram for each region of interest in the source image.

In other, more detailed features of the invention, the method further includes defining new regions of interest that overlap adjacent regions of interests included in the plurality of regions of interest in both the source and target images, calculating a histogram of the image quality for each of the new regions of interest in both the source and target images, averaging the histogram of one new region of interest in the source image and the histogram of a spatially counterpart new region of interest in the target image to generate a cumulative histogram for the new region of interest in both the source and target images, normalizing the cumulative histogram for the new region of interest in the source image by the histogram for the source image, inverse mapping the normalized cumulative histogram for the new region of interest in the source image, and generating the corrected image based on the inverse mapping of the normalized cumulative histogram for the new region of interest in the source image.

Another exemplary method according to the invention is a method for removing flicker in a sequence of images that includes providing a sequence of images having a source image and a target image, subdividing the source image into a plurality of regions of interest, subdividing the target image into a plurality of regions of interest having the same shape and location in the target image as the plurality of regions of interest in the source image, measuring an image quality for all of the pixels included in one of the regions of interest in the source image, measuring an image quality for all of the pixels included in a spatially counterpart region of interest in the target image, and generating a corrected source image based on the measured image quality of the source image and the measured image quality of the target image.

An exemplary embodiment of the invention is an apparatus for removing flicker in a sequence of images that includes a computer having a data processor and a computer-readable medium, and a first, second, third, fourth, fifth, and sixth set of instructions embodied in the computer-readable medium. The first set of instructions directs the data processor to provide a sequence of images including a source image and a target image. The second set of instructions directs the data processor to subdivide the source image into a plurality of regions of interest. The third set of instructions directs the data processor to subdivide the target image into a plurality of regions of interest having the same shape and location in the target image as the plurality of regions of interest in the source image. The fourth set of instructions directs the data processor to measure an image quality for all of the pixels included in one of the regions of interest in the source image. The fifth set of instructions directs the data processor to measure an image quality for all of the pixels included in a spatially counterpart region of interest in the target image. The sixth set of instructions directs the data processor to generate a corrected source image based on the measured image quality of the source image and the measured image quality of the target image.

Other features of the invention should become apparent from the following description of the preferred embodiments taken in conjunction with the accompanying drawings, which illustrate, by way of example, the principles of the invention.

DETAILED DESCRIPTION OF THE PREFERRED EMBODIMENTS

The method and apparatus of flicker removal according to the present invention is an algorithm designed to operate on a sequence of images that have a certain continuity of content and/or action in the sequence. Typically, such a sequence of images is referred to as a "shot" or "cut" in the film and digital imaging industry. This requirement is standard for any correction algorithm, since different shots are designed to vary dramatically for story reasons, and correction across a shot would modify the intent of the entire sequence. In one embodiment of the present invention, the algorithm was programmed in C++ and run on a Pentium 4 computer.

Figure 1A:
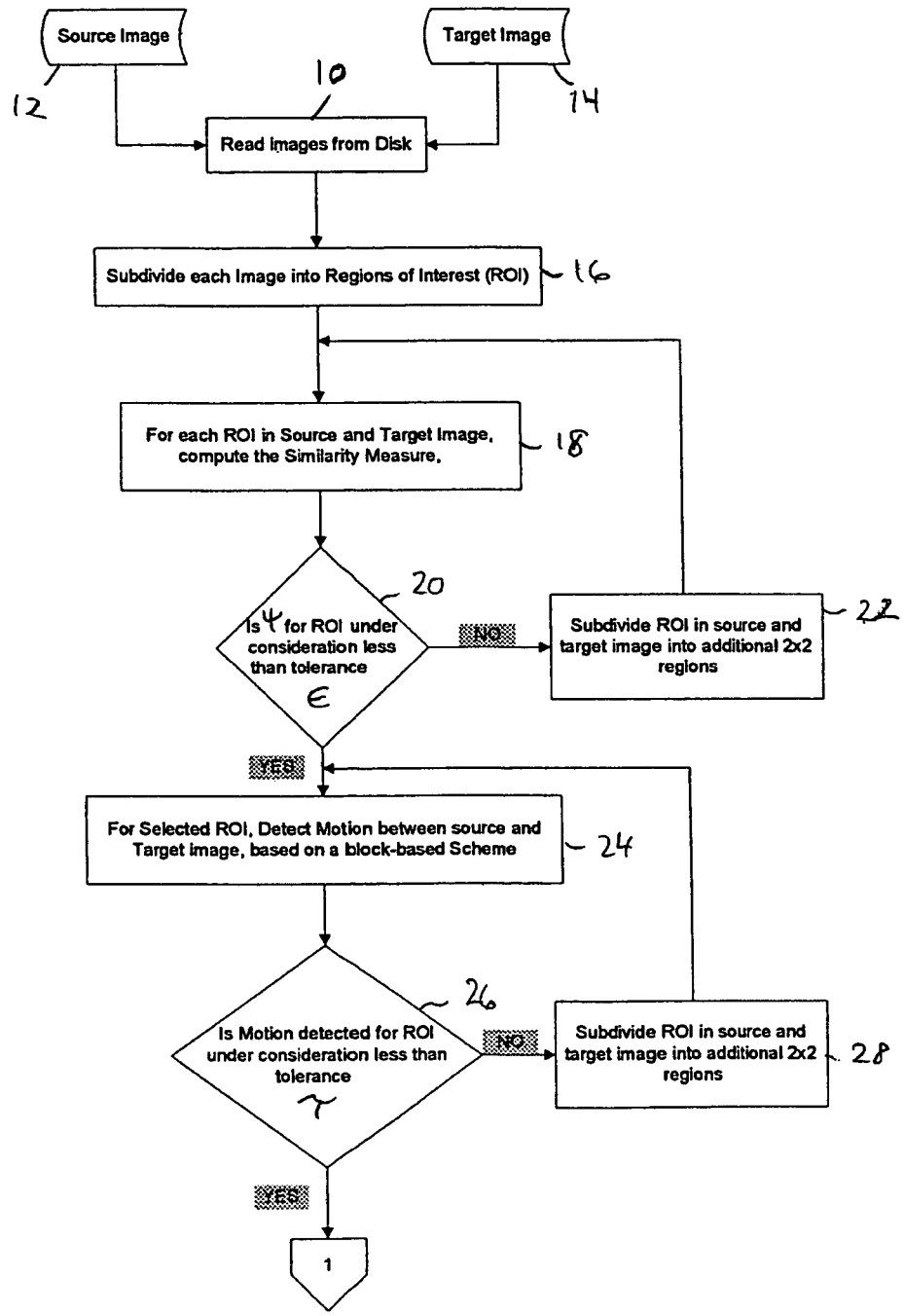
FIGS. 1*a-c* are flowcharts of an algorithm for a flicker removal process according to a preferred embodiment.
Figure 1B:
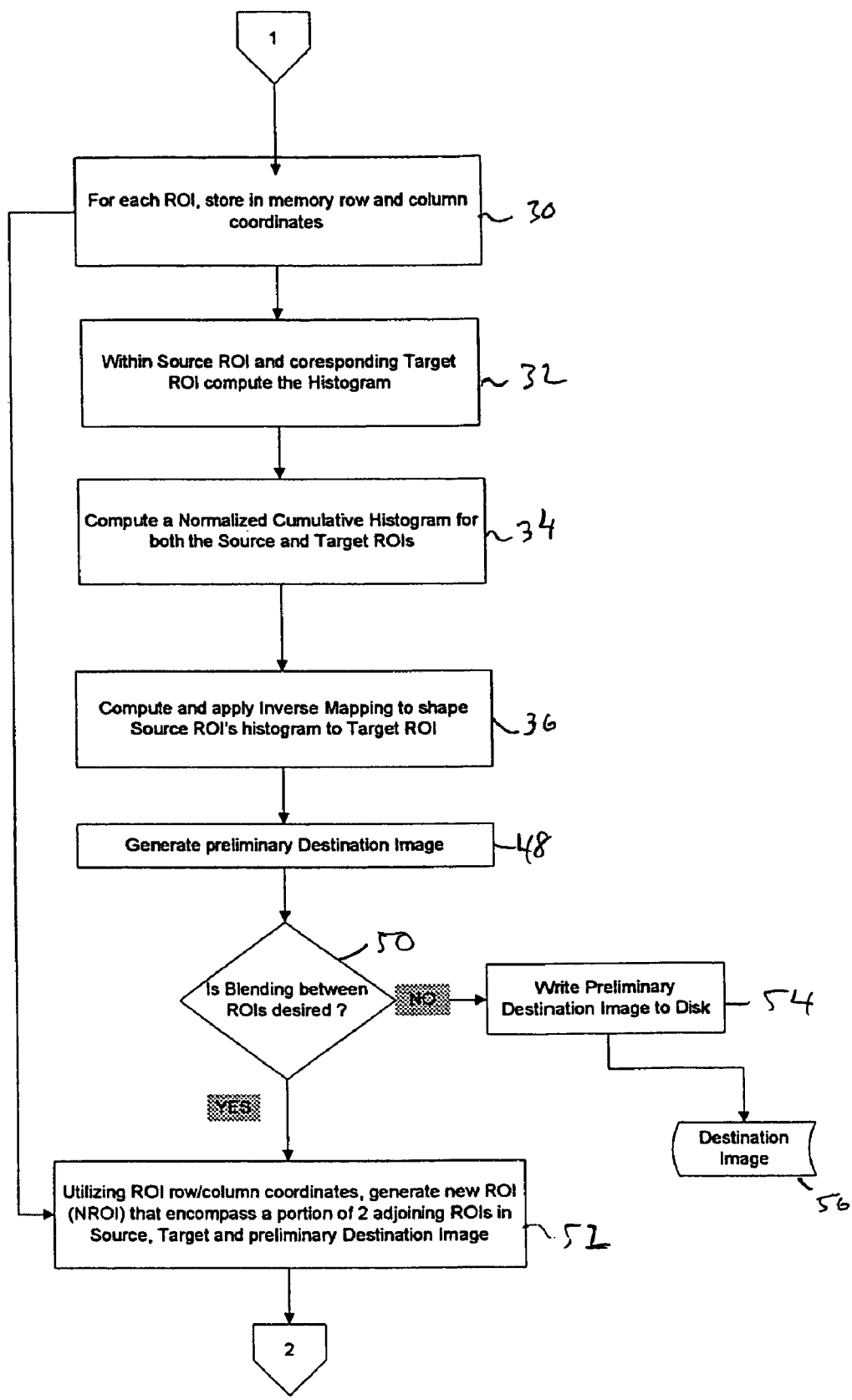
Figure 1C:
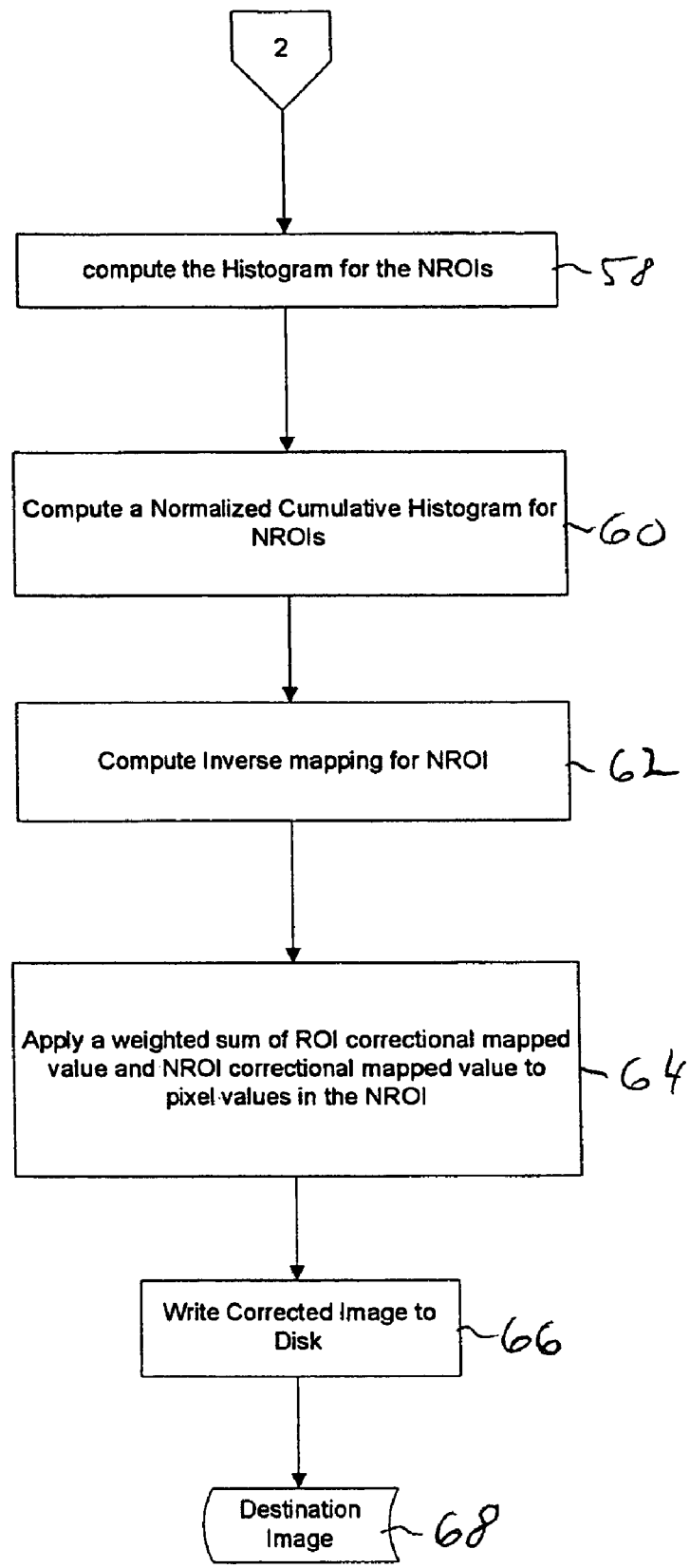

An exemplary algorithm according to the present invention is illustrated in FIGS. 1*a-c*. The first step 10 of the algorithm is to read a source image 12 and a target image(s) 14 from the sequence of images, which are stored on disk. In the case where the sequence of images is a sequence of frames from a motion picture, each of the source and target images would constitute individual frames of the sequence. The present invention's flicker removal algorithm operates to remove flicker from the source image based on the luminance amplitude, contrast, and/or chrominance amplitude of the target image(s). Thus, characteristics of the target image(s) are measured and used to correct for flicker in the source image. The target image(s) can be an image(s) from the scene that occur both before and after the source image in the sequence. Target images that occur later in time are referred to as "next target images," while images that occur earlier in time are referred to as "previous target images." The algorithm may utilize both next and previous target images. The image output from the algorithm is referred to as a corrected image or destination image.

In step 16, the algorithm automatically identifies regions of interest ("ROIs") within the source image 12 that are relatively homogeneous in terms of the luminance or chrominance distribution, and the motion within each of the ROIs is small relative to the target image(s) 14. Initially, the algorithm sections the images, both source and target, into nine ROIs. The nine ROIs are configured to form a three block by three block array. The number of ROIs is entirely arbitrary, and the ROIs can be chosen to be any size.

In the next step 18 of the algorithm, a similarity measure, $\psi$, is computed for the source and target images 12 and 14, respectively. The similarity measure is utilized in the algorithm to reduce the variance in the luminance, contrast, or chrominance in an image, caused by noise or film grain and dirt that is commonplace in digitized film images. The similarity measure is defined as:

$$\psi = \sigma^2/\mu$$

where: $\sigma^2$ is the variance in the luminance, contrast, or chrominance in an image of pixels within an ROI, and
$\mu$ is the mean value of the luminance, contrast, or chrominance in an image in the pixels within the ROI.

In step 20, if the similarity measure for each of the ROIs in the source image 12 and the target image(s) 14 is greater than a tolerance value $\epsilon$, then the ROI is subdivided further into four smaller blocks, forming a subdivided two block by two block array in step 22, and the process is repeated. The algorithm need not be bounded by a lower limit on the size of the ROI.

After the similarity measure is found to be within the tolerance value, $\epsilon$, a block-based motion detection algorithm is used to determine the variation in the selected ROI as indicated in step 24. This is accomplished by selecting square windows, for example, five pixel by five pixel square windows, within the ROI, and calculating one motion detection value for each square window. The motion detection value is the average luminance, contrast, or chrominance of all the pixels in the square window. Since each square window contains an average of $m^2$ nearby pixels, where m is the number of pixels defining one edge of the square window, the noise sensitivity is reduced dramatically compared to the case where each pixel is analyzed by itself.

Next, each square window within the ROI of the source image 12 is compared to a corresponding square window in a target image 14. In the next step 26, if the difference in motion detection value exceeds a tolerance $\tau$, then the area of the source image covered by the square window is said to have considerable motion. Additionally, it is possible to decide how many such square windows must have considerable motion before the whole ROI is thought to have considerable motion. If considerable motion exists for the ROI, the size of the ROI is further subdivided into four smaller blocks forming a two block by two block array as indicated in step 28, and the motion detection algorithm is repeated.

According to step 30, after the ROI is selected and the ROI has a similarity measure less than the similarity measure tolerance $\epsilon$ (see step 20), and a motion detection difference value less than the motion detection tolerance $\tau$ (see step 26), the row and column coordinates for each ROI are stored in memory, thus providing an easy mechanism to be used in revisiting the ROI at a later time. In step 32, histograms of the luminance distribution for each ROI in a black and white image are computed. Similarly, for color images, a histogram for each of individual color channels, i.e., red, green, and blue, is computed for each ROI. The histogram is a commonly used statistical descriptor of images and sub-images, e.g., ROI, within an image in an image sequence. The histogram is a function that provides a measure of the probability that a particular pixel brightness P(r) will occur within an image or subimage. For example, the histogram of a digital image with gray levels from 0 to L−1 is the discrete function:

$$P(r_k) = n_k/N$$

where: $r_k$ is the kth gray level,
$n_k$ is the number of pixels in the image with that gray level,
N is the total number of pixels in the image, and
k=0, 1, 2, . . . L−1.

While the histogram can be generated for the entire image, it can also be generated for any region within the image. For example, when calculating a histogram for an ROI within an image, N in the above-listed equation would be the number of pixels within the ROI.

According to step 32 of the algorithm, a histogram is calculated for each of the source and target images 12 and 14, respectively. In the next step 34, the histograms for each of the corresponding ROIs in the source and target images are averaged to generate a cumulative histogram. As previously mentioned, the algorithm can utilize previous and/or next target images. In the case of multiple target images, two distinct groups of histograms are computed. One group of histograms is for the next target images, which occur earlier in time than the source image, and the other group of histograms is for the next target images, which occur later in time than the source image. The histograms for each group independently are compared to the source image's histogram. This process can be extended to multiple previous and/or next target images.

The cumulative histogram is then normalized (see step 34) so that the cumulative probability distribution of one ROI in an image can be compared to another ROI. The correction task then becomes one of identifying the contribution of each source pixel's luminance, contrast, and/or chrominance to the histogram and computing the inverse mapping to the target pixel as indicated in step 36. This process is repeated for each of the ROIs identified in the source and target images 12 and 14, respectively. Expressed mathematically, the process for calculating the histogram and inverse mapping is as follows:

$$\text{Suppose } s = T(r) = \int_0^r p_r(w)dw, \text{ and}$$

$$v = G(z) = \int_0^z p_z(w)dw$$

where: $p_r(r)$ is the source histogram, and
$p_z(z)$ is the target histogram.

Then, $z = G^{-1}(v)$, however since it is desired to force the functions s and v to be the same, $$z = G^{-1}(v) = G^{-1}(s) = G^{-1}(T(r)).$$

Figures 2A, 2B, 2C, 2D, 2E:
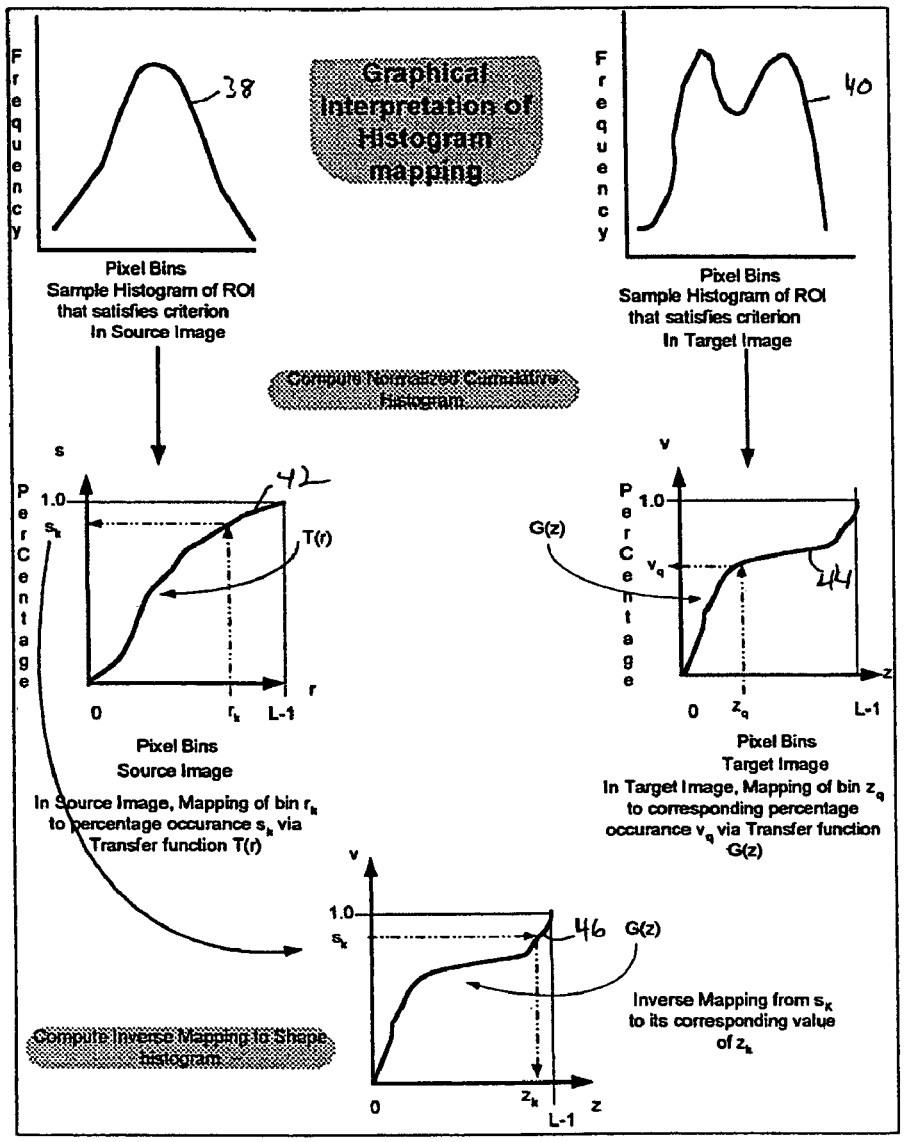
FIGS. 2*a-e* are illustrations of a histogram mapping and inverse mapping process for a grouping of pixel bins according to a preferred embodiment.

FIGS. 2a-e are graphs depicting the various steps of the histogram mapping and inverse mapping processes. In all of FIGS. 2a-e, the horizontal axis represents the number of the pixel bins within the image or region of interest. FIGS. 2a and 2b are graphs of histogram plots 38 and 40, respectively, of an ROI within a source image 12 and a target image 14, respectively, each having a similarity measure less than the threshold value ϵ (see step 20) and a detected motion less than the tolerance value τ (see step 26), where the vertical axis is the frequency of occurrence. FIGS. 2c and 2d are graphs of the transfer functions T(r) 42 and G(z) 44 of the histograms illustrated in FIGS. 2a and 2b, respectively, where the vertical axis is a percentage. The inverse mapping 46 of the transfer function T(r) is illustrated in FIG. 2e. Accordingly, the algorithm, in step 48, then modifies the original source image ROI's histogram so as to match the histogram of the corresponding ROI(s) in the target image(s) and generate a preliminary destination image.

In order to make the transitions between the ROIs appear smooth, corrected, and seamless, an additional pass of the histogram mapping and inverse mapping processes can be carried out in step 50. This additional pass is performed on new ROIs ("NROIs") formed in step 52 which are regions that are smaller than the ROIs, for example, 10% of the size of the ROIs, and overlap adjoining regions between ROIs in the source 12, target 14, and preliminary destination images. This additional pass of the histogram mapping and inverse mapping processes is used to apply a secondary correction, one that takes into account the uncorrected region, the corrected adjoining regions, and the NROIs to generate a new destination image. If the additional pass is not performed, the preliminary destination image is written to disk storage in step 54 and the destination image is output in step 56.

Initially, when the additional pass is performed on the NROIs, a histogram is computed for the NROIs in step 58, followed by the computation of a normalized cumulative histogram for the NROIs in step 60. Next, in step 62, the inverse mapping for the NROI is computed. A weighted sum of ROI correctional mapped values and NROI correctional mapped values are applied to pixel values in the NROI in step 64. Finally, the corrected image is written to disk in step 66 and output as the destination image in step 68.

The algorithm according to the present invention can be applied to the sample sequence of images 70 shown in FIGS. 3a-f from the movie "High Society" (1955). The sequence shown in FIGS. 3a-f exhibits very fast motion, which is demonstrated by Grace Kelly's character twirling a handkerchief in a clockwise, and then a counterclockwise direction. In addition, there is camera movement, pan, toward screen right.

Figures 3A, 3B, 3C:
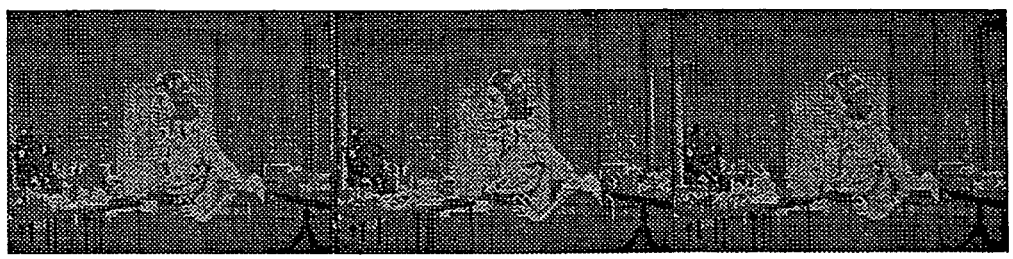
FIGS. 3*a-f* are frames from a motion picture sequence.
Figures 3D, 3E, 3F:
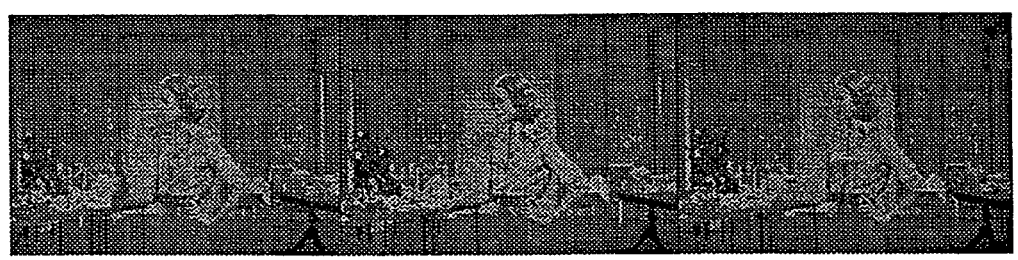

The sequence 70 shown in FIGS. 3a-f, includes a large amount of localized and global flicker, which is observable only when the images are shown successively. Referring more specifically to FIGS. 3b and 3c as an example, it may be desirable to correct the flicker shown in FIG. 3c, and make that frame appear like the frame in FIG. 3b. Accordingly, the FIG. 3c frame would be the source image 12 and the FIG. 3b frame would be the target image 14 input to the algorithm.

Figure 4A:
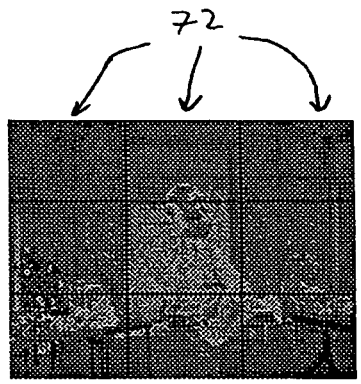
FIGS. 4*a-b* are example source and target frames taken from FIGS. 3*c* and 3*b*, respectively, each superimposed by a grid defining nine regions of interest.
Figure 4B:
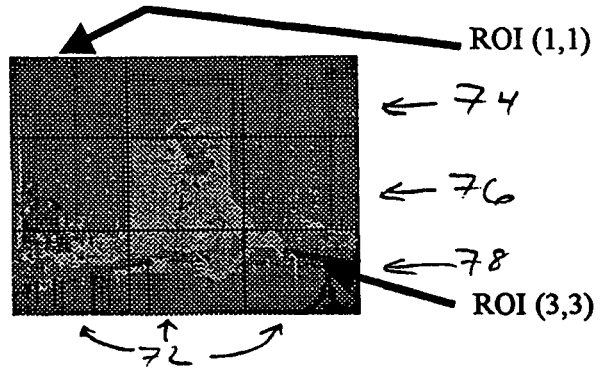

Next, as shown in FIGS. 4a and 4b, respectively, the algorithm selects nine ROIs 72 in both of the images shown in frames FIG. 3c and 3b. The ROIs are numbered: (1,1), (1,2), and (1,3) along the first row 74; (2,1), (2,2), and (2,3) along the second row 76; and (3,1), (3,2), and (3,3) along the third row 78. In this example, it is assumed that the similarity measure is below the tolerance ϵ in each of the ROIs (1,1), (1,2), (1,3), (2,3), and (3,3). Further, for this example, it is assumed that the measured motion detection for all of the ROIs in both the source and target images is below the tolerance τ.

Figure 5A:
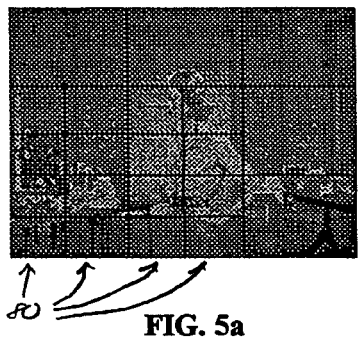
FIGS. 5*a-b* are the source and target frames of FIGS. 4*a-b*, each superimposed by additional grids defining subdivided regions of interest.
Figure 5B:
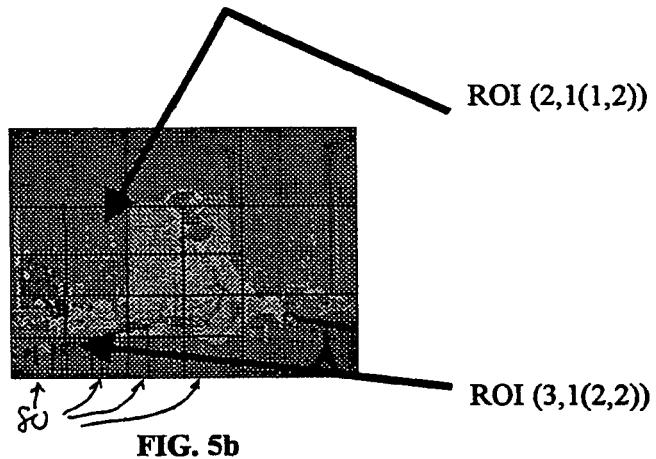

Since the similarity measure is above tolerance ϵ in ROIs (2,1), (2,2), (3,1), and (3,2) 72, these ROIs are subdivided further in both the source and target images as shown in FIGS. 5a and 5b, respectively. The similarity measure is computed again for the subdivided ROIs (2,1)[(1,1), (1,2), (2,1), and (2,2)], (2,2)[(1,1), (1,2), (2,1), and (2,2)], (3,1)[(1,1), (1,2), (2,1), and (2,2)], and (3,2)[(1,1), (1,2), (2,1), and (2,2)] 80. In this example, it is assumed that all of the subdivided ROIs now satisfy the similarity measure tolerance ϵ.

Histograms are computed for each of the ROIs 72 and subdivided ROIs 80, and then, the cumulative histograms are computed and normalized for the target images 14. The histograms for each of the ROIs or subdivided ROIs in the source image 12 shown in FIG. 5a are then "shaped" into the form that exists in the corresponding ROI or subdivided ROI in the target image, depicted in FIG. 5b, by computing the inverse transformation of the histograms for the source and target images and making the inverse transformations equal to one another.

Figure 6:
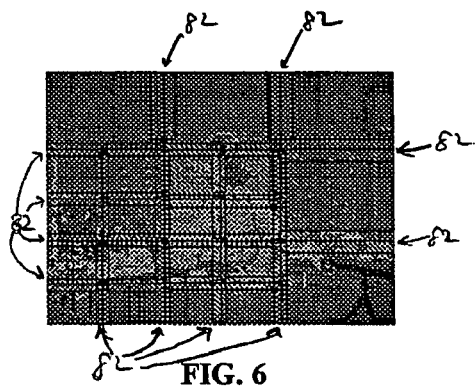
FIG. 6 is a corrected frame superimposed by rectangular shapes that define new regions of interest.

As discussed above and depicted in FIG. 6, in order to make the transitions between the ROIs 72 or subdivided ROIs 80 appear seamless, NROIs 82 are selected that overlap the boundaries of the ROIs or subdivided ROIs. FIG. 6 illustrates the rectangular shapes that define the NROIs, which overlap the boundaries of the ROIs and subdivided ROIs. Histograms are generated for the NROIs (see steps 58 and 60), and the algorithm is repeated for the NROIs as shown in the flowchart of FIG. 1c. Accordingly, in addition to calculating the histogram for the NROIs, the correction and "shaping" processes steps 62 and 64 are repeated, with the new correction applied to the pixels in the NROIs as indicated in step 64. Thus, the pixel values in the NROIs are a combination of the original pixel values, the corrected values from the original ROIs, and the new corrections for the NROIs. Finally, in steps 66 and 68, the corrected image is written to disk storage and the destination image is output.

Advantageously, the algorithm according to the present invention can be applied to color and/or black and white images having a wide range of camera motion, and on objects exhibiting random motion within a scene. Also, the invention is resolution and bit depth independent, with operations carried out in floating point precision. In color sequences, the invention permits the correction of individual channels, for example, red, green, blue, CMYK (cyan, magenta, yellow, and black), or n channels, e.g., n equals 6 in HexColor, and also flicker correction utilizing the cross-color correlation between channels. The algorithm according to the invention advantageously can be iteratively applied without introducing motion artifacts since no motion correction is applied to the image or portion of an image under consideration. The invention also introduces the similarity measure, which is used to determine homogeneity between ROIs in successive images in terms of luminance, chrominance, and also relative motion within the ROIs.

The algorithm according to the present invention can be applied to various restoration and correction processes including restoration of black and white films; restoration of color films, which may include any number of channels, for example, four-channel CMYK for print material, and six-channel hex-color; correction of lighting variations in photography obtained from either conventional or digital means. The algorithm according to the present invention also can be applied to automatic correction of luminance and chrominance for any sequence of digital images, for example, images acquired using digital means including scanners, digital cameras, CDROMs, or DVDs. Furthermore, the algorithm according to the present invention can be used to facilitate more efficient image compression since the sequences are more homogeneous, thus resulting in bandwidth reduction.

Those skilled in the art should recognize that while rectangular or square-shaped ROIs 72, NROIs 82, and windows (not shown) have been discussed here, ROIs, NROIs, or windows of other shapes could be utilized, for example, ROIs that match the shape of individual objects within the source and target images. Furthermore, cross-color correlation techniques could be added to the process resulting in added flicker reduction. The color balance in homogenous regions should be similar in both the source and target images. An additional correction pass would be used to identify what correction should be effected to maintain similar color balance.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

What is claimed is:

1. A computer implemented method for removing flicker in a sequence of images, the method comprising:
    reading a sequence of images including a source image and a target image, wherein each image in the sequence of images includes a plurality of pixels and flicker exists in the sequence of images;
    defining a plurality of regions of interest in the source image and a plurality of spatially counterpart regions of interest in the target image;
    measuring an image quality for all of the pixels in each of the regions of interest in the source image;
    measuring an image quality for all of the pixels in each of the spatially counterpart regions of interest in the target image;
    generating a corrected source image on a region of interest basis depending on the image quality for the pixels in each of the plurality of regions of interest in the source image and the spatially counterpart regions of interest in the target image; and
    storing the corrected source image for output in a corrected sequence of images wherein the flicker existing in the sequence of images is removed.

2. The method according to claim 1, wherein the target image is selected from the group consisting of a previous target image that is before the source image in the sequence of images and a next target image that is after the source image in the sequence of images.

3. The method according to claim 1, wherein a shape of the regions of interest in both the source image and the target image is selected from the group consisting of a rectangle, a square, and a triangle.

4. The method according to claim 1, wherein each image of the sequence of images is included in one frame of a motion picture.

5. The method according to claim 1, wherein the sequence of images is stored on a storage disk.

6. The method according to claim 1, wherein the images included in the sequence of images are black and white images, color images, or a combination of black and white images and color images.

7. The method according to claim 1, wherein the image quality is selected from the group consisting of luminance amplitude, contrast, and chrominance amplitude.

8. The method according to claim 1, further comprising:
    calculating similarity measurements of the image quality for the pixels in each of the plurality of regions of interest in the source image and each of the plurality of spatially counterpart regions of interest in the target image; and
    comparing the similarity measurements to a tolerance value, if any of the similarity measurements is greater than or equal to the tolerance value, then:
    subdividing both the region of interest in the source image and the spatially counterpart region of interest in the target image for which the similarity measurement is greater than or equal to the tolerance value,
    recalculating the similarity measurements for each subdivided region of interest in both the source image and the target image,
    comparing the recalculated similarity measurements to the tolerance
    value, and continuing to subdivide the regions of interest in both the source image and the target image until the similarity measurements for each region of interest are less than the tolerance value.

9. The method according to claim 8, further comprising: selecting a first window within the source image and a spatially counterpart second window within the target image; and calculating motion detection values for both the first window and the second window.

10. The method according to claim 9, wherein a shape of the first and second windows is selected from the group consisting of a rectangle, a square, a triangle, an ellipse, and a circle.

11. The method according to claim 9, wherein the motion detection value is an average value of the image quality for the pixels within a window.

12. The method according to claim 9, further comprising calculating a difference between the motion detection value for the first window and the motion detection value for the second window, wherein:
    if the difference between the motion detection values for the first and second windows is less than a tolerance, coordinates of the region of interest within which the first window is located and coordinates of the region of interest within which the second window is located are stored in memory;
    otherwise, the regions of interest within which the first and second windows are located are subdivided, the first and second windows are reselected, the motion detection value is recalculated for both the first and second windows, and this process is repeated until the difference between the motion detection values for the first and second windows is less than the tolerance.

13. The method according to claim 12, further comprising: calculating a histogram of the image quality for the source image; calculating a histogram of the image quality for each of the plurality of regions of interest in both the source image and the target image after the difference between the motion detection values of the first window and the second window is less than the tolerance; averaging the histogram of each region of interest in the source image and the histogram of each spatially counterpart region of interest in the target image to generate a cumulative histogram for each region of interest in the source image; normalizing the cumulative histogram for each region of interest in the source image by the histogram for the source image; inverse mapping the normalized cumulative histogram for each region of interest in the source image; and generating the corrected source image based on the inverse mapping of the normalized cumulative histogram for each region of interest in the source image.

14. The method according to claim 13, further comprising:
defining new regions of interest that overlap adjacent regions of interests included in the plurality of regions of interest in both the source and target images;
calculating a histogram of the image quality for each of the new regions of interest in both the source and target images;
averaging the histogram of one new region of interest in the source image and the histogram of a spatially counterpart new region of interest in the target image to generate a cumulative histogram for the new region of interest in both the source and target images;
normalizing the cumulative histogram for the new region of interest in the source image by the histogram for the source image;
inverse mapping the normalized cumulative histogram for the new region of interest in the source image; and
generating the corrected image based on the inverse mapping of the normalized cumulative histogram for the new region of interest in the source image.

15. A computer-implemented method for removing flicker in a sequence of images, the method comprising:
reading a sequence of images including a source image and a target image, wherein each image in the sequence of images includes a plurality of pixels and flicker exists in the sequence of images;
subdividing the source image into a plurality of regions of interest;
subdividing the target image into a plurality of regions of interest having the same shape and location in the target image as the plurality of regions of interest in the source image;
measuring an image quality for all of the pixels included in one of the regions of interest in the source image;
measuring an image quality for all of the pixels included in a spatially counterpart region of interest in the target image; generating a corrected source image based on the measured image quality of the source image and the measured image quality of the target image; and
storing the corrected source image for output in a corrected sequence of images wherein the flicker existing in the sequence of images is removed.

16. The method according to claim 15, further comprising:
calculating similarity measurements of the image quality for the pixels in each region of interest in the source image and each region of interest in the target image; and
comparing the similarity measurements for each of the regions of interest to a tolerance value, if any of the similarity measurements is greater than or equal to the tolerance value, then:
subdividing the region of interest in the source image and the spatially counterpart region of interest in the target image for which the similarity measurement is greater than or equal to the tolerance value,
recalculating the similarity measurements for each subdivided region of interest in both the source image and the target image,
comparing the recalculated similarity measurements to the tolerance value, and continuing to subdivide the regions of interest in both the source image and the target image until the similarity measurements are less than the tolerance value.

17. The method according to claim 16, further comprising:
selecting a first window within a region of interest in the source image and a spatially counterpart second window in a region of interest in the target image;
calculating motion detection values within both the first window and the second window; and calculating a difference between the motion detection value of the first window and the motion detection value of the second window, wherein:
if the difference between the motion detection values for the first and second windows is less than a tolerance, the coordinates of the regions of interest in both the source and target images are stored in memory,
otherwise, the regions of interest in the source and target images containing the first and second windows are subdivided, the first and second windows are reselected, the motion detection value is recalculated for both the first and second windows, and this process is repeated until the difference between the motion detection values for the first and second windows is less than the tolerance.

18. The method according to claim 17, further comprising:
calculating a histogram of the image quality for the source image;
calculating a histogram of the image quality for each of the plurality of regions of interest in both the source image and the target image after the difference between the motion detection values of the first window and the second window is less than the tolerance;
averaging the histogram of one region of interest in the source image and the histogram of a spatially counterpart region of interest in the target image to generate a cumulative histogram;
normalizing the cumulative histogram for the one region of interest in the source image by the histogram for the source image;
inverse mapping the normalized cumulative histogram for the one region of interest in the source image; and
generating the corrected source image based on the inverse mapping of the normalized cumulative histogram for the one region of interest in the source image.

19. The method according to claim 18, further comprising:
defining new regions of interest that overlap adjacent regions of interests included in the plurality of regions of interest in both the source image and the target image;
calculating a histogram of the image quality for each of the new regions of interest in both the source image and the target image;
averaging the histogram of one new region of interest in the source image and the histogram of a spatially counterpart new region of interest in the target image to generate a cumulative histogram for the new regions of interest in both the source and target images;
normalizing the cumulative histogram for the new region of interest in the source image by the histogram for the source image;
inverse mapping the normalized cumulative histogram for the new region of interest in the source image; and
generating the corrected image based on the inverse mapping of the normalized cumulative histogram for the new region of interest in the source image.

20. An apparatus for removing flicker in a sequence of images, wherein each image in the sequence of images includes a plurality of pixels, the apparatus comprising:
a computer including a data processor and a computer-readable medium holding encoded instructions for:

reading a sequence of images including a source image and a target image, wherein each image in the sequence of images includes a plurality of pixels and flicker exists in the sequence of images;

subdividing the source image into a plurality of regions of interest;

subdividing the target image into a plurality of regions of interest having the same shape and location in the target image as the plurality of regions of interest in the source image;

measuring an image quality for all of the pixels included in one of the regions of interest in the source image;

measuring an image quality for all of the pixels included in a spatially counterpart region of interest in the target image;

generating a corrected source image based on the measured image quality of the source image and the measured image quality of the target image; and storing the corrected source image for output in a corrected sequence of images wherein the flicker existing in the sequence of images is removed.

* * * * *